United States Patent
Memetla Martinez

(10) Patent No.: US 10,336,228 B2
(45) Date of Patent: Jul. 2, 2019

(54) FOUR-COMPONENT ARMREST ASSEMBLY AND METHOD OF MANUFACTURING SAME

(71) Applicant: FORD GLOBAL TECHNOLOGIES, LLC, Dearborn, MI (US)

(72) Inventor: Humberto Memetla Martinez, Benito Juarez (MX)

(73) Assignee: Ford Global Technologies PLLC, Dearborn, MI (US)

( * ) Notice: Subject to any disclaimer, the term of this patent is extended or adjusted under 35 U.S.C. 154(b) by 116 days.

(21) Appl. No.: 15/458,069

(22) Filed: Mar. 14, 2017

(65) Prior Publication Data
US 2018/0264980 A1   Sep. 20, 2018

(51) Int. Cl.
 *B60N 2/75* (2018.01)
 *B29C 70/48* (2006.01)
 *B29L 31/30* (2006.01)

(52) U.S. Cl.
 CPC ............ *B60N 2/75* (2018.02); *B29C 70/48* (2013.01); *B29K 2913/00* (2013.01); *B29L 2031/3026* (2013.01)

(58) Field of Classification Search
 CPC ...... B60N 2/75; B29C 70/48; B29K 2913/00; B29L 2031/3026
 See application file for complete search history.

(56) References Cited

U.S. PATENT DOCUMENTS

| | | | | | |
|---|---|---|---|---|---|
| 3,362,749 A | * | 1/1968 | Clement | ............... | B60N 2/78 297/411.21 |
| 3,387,881 A | * | 6/1968 | Stepanek | ............... | B60N 2/78 296/153 |
| 4,331,360 A | * | 5/1982 | Roudybush | ............ | A47C 5/12 108/901 |
| 4,783,114 A | * | 11/1988 | Welch | ................... | B60J 5/042 296/153 |
| 5,064,247 A | * | 11/1991 | Clark | ..................... | A47C 3/04 297/232 |
| 5,181,759 A | * | 1/1993 | Doolittle | ................. | B60N 3/02 296/153 |
| 5,190,707 A | * | 3/1993 | Yanagishita | ......... | B29C 44/581 264/278 |
| 5,387,390 A | * | 2/1995 | Kornylo | ............... | B29C 44/146 264/46.8 |
| 5,527,084 A | * | 6/1996 | Scherf | ................. | B60R 21/0428 296/153 |
| 5,803,415 A | * | 9/1998 | Konishi | .................. | B60N 2/78 248/118 |
| 5,939,165 A | * | 8/1999 | Oike | ....................... | B32B 27/08 264/46.5 |
| 6,248,205 B1 | * | 6/2001 | Scheidmantel | .......... | B60N 2/78 156/309.6 |
| 6,475,576 B1 | * | 11/2002 | Ashtiani | ................. | B32B 5/18 428/31 |

(Continued)

*Primary Examiner* — James M Ference
(74) *Attorney, Agent, or Firm* — Vichit Chea; King & Schickli PLLC

(57) ABSTRACT

An armrest assembly includes a support substrate, a fabric layer stretching across a receiver of the support substrate and a matrix interface connecting the fabric layer to the support substrate. A cushion overlies the fabric layer and the receiver and a coverstock conceals the cushion and the fabric layer while closing the receiver. A method of producing the armrest assembly is also disclosed.

11 Claims, 4 Drawing Sheets

(56) References Cited

U.S. PATENT DOCUMENTS

| | | | | |
|---|---|---|---|---|
| 6,893,077 B1* | 5/2005 | DeJongh | ............ | B60N 2/42709 296/187.05 |
| 7,070,221 B2* | 7/2006 | Cowelchuk | ............ | B60N 2/78 296/39.1 |
| 7,104,590 B2* | 9/2006 | Dooley | ............ | B60R 13/0206 296/153 |
| 7,121,611 B2* | 10/2006 | Hirotani | ............ | B60J 5/0451 296/146.7 |
| 7,247,382 B2* | 7/2007 | Gardner, Jr. | ............ | B29C 37/0032 428/424.6 |
| 7,387,326 B2* | 6/2008 | Osada | ............ | B60R 21/0428 296/1.09 |
| 7,503,621 B2* | 3/2009 | Mani | ............ | B60R 21/0428 226/153 |
| 7,658,426 B2* | 2/2010 | Hayakawa | ............ | B29C 33/14 296/39.1 |
| 7,681,939 B2* | 3/2010 | Augustyn | ............ | B60N 2/78 296/146.7 |
| 7,726,726 B2* | 6/2010 | Cavallin | ............ | B60R 21/0428 296/146.7 |
| 7,731,268 B2* | 6/2010 | Motowski | ............ | B60N 2/78 296/153 |
| 7,775,584 B2* | 8/2010 | Hughes, Jr. | ............ | B60N 2/78 296/187.05 |
| 7,794,009 B2* | 9/2010 | Pinkerton | ............ | B60N 2/4235 296/153 |
| 7,794,010 B2* | 9/2010 | Saida | ............ | B60R 21/0428 296/153 |
| 7,828,388 B2* | 11/2010 | Thomas | ............ | B60N 2/4235 297/411.21 |
| 7,871,119 B2* | 1/2011 | Schoemann | ............ | B60R 13/0243 296/146.7 |
| 8,157,309 B2* | 4/2012 | Ishikawa | ............ | B60R 21/0428 296/1.08 |
| 8,172,311 B2 | 5/2012 | Hughes, Jr. et al. | | |
| 8,424,954 B2* | 4/2013 | Hall | ............ | B60N 2/4235 296/153 |
| 8,632,117 B1* | 1/2014 | Sanchez Cruz | ............ | B60R 13/0243 296/153 |
| 8,944,515 B2* | 2/2015 | Kono | ............ | B60N 2/64 297/218.3 |
| 9,463,723 B2 | 10/2016 | Hamdoon et al. | | |
| 9,481,274 B2* | 11/2016 | Laird | ............ | B60N 2/42709 |
| 9,505,325 B2 | 11/2016 | Doan et al. | | |
| 2004/0007892 A1* | 1/2004 | Harata | ............ | B60R 13/0815 296/39.1 |
| 2005/0186388 A1* | 8/2005 | Mekas | ............ | B32B 3/266 428/116 |
| 2006/0141240 A1* | 6/2006 | Ota | ............ | B32B 1/00 428/319.3 |
| 2007/0069548 A1* | 3/2007 | Dooley | ............ | B60R 13/02 296/146.7 |
| 2010/0133866 A1* | 6/2010 | Hipshier | ............ | B29C 45/1676 296/1.08 |
| 2012/0231215 A1* | 9/2012 | Hayashi | ............ | B60R 13/0243 428/138 |
| 2014/0021733 A1* | 1/2014 | Hipshier | ............ | B60R 13/0262 296/1.08 |
| 2015/0258939 A1* | 9/2015 | Hipshier | ............ | B60R 7/04 160/229.1 |
| 2015/0283926 A1* | 10/2015 | Hamdoon | ............ | B60N 2/4235 297/411.21 |
| 2016/0167550 A1* | 6/2016 | Doan | ............ | B60N 2/427 297/411.21 |
| 2018/0264980 A1* | 9/2018 | Memetla Martinez | ............ | B29C 70/48 |

* cited by examiner

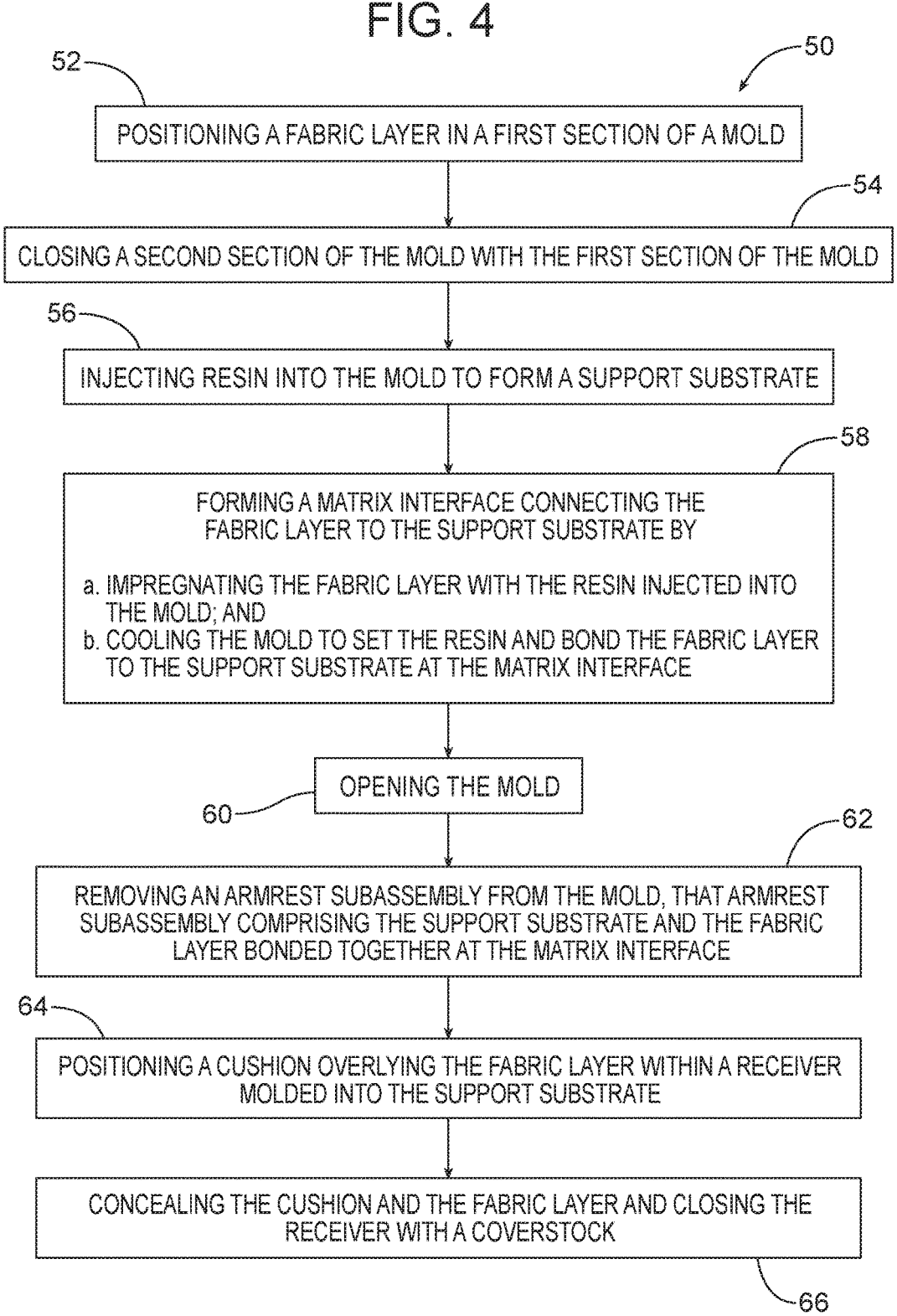

FOUR-COMPONENT ARMREST ASSEMBLY AND METHOD OF MANUFACTURING SAME

TECHNICAL FIELD

This document relates generally to the motor vehicle equipment field and, more particularly, to a new and improved armrest assembly as well as to a method of making that armrest assembly.

BACKGROUND

In the past, an armrest assembly A has been made from five component parts (see FIG. 1). Those component parts include a substrate support S typically molded from a resin material. A fabric frame FF is separately molded from a resin material and mounted on the support substrate S. A fabric layer F is then attached to the fabric frame FF. A cushion C made from foam or other appropriate material is then provided on the support substrate overlying the fabric layer F. An A-surface of coverstock CS is then secured to the support substrate S concealing and overlying the cushion C, the fabric F and the fabric frame FF.

This document relates to a new and improved armrest assembly that includes only four components. More specifically, the separate fabric frame FF used in the prior art armrest assembly illustrated in FIG. 1 is eliminated. As a result, the new and improved armrest assembly eliminates the manufacturing steps of separately molding the fabric frame and mounting the fabric frame to the support substrate. Accordingly, the new and improved armrest assembly may be made by a more efficient production method that reduces production costs and production time.

SUMMARY

In accordance with the purposes and benefits described herein, a new and improved armrest assembly is provided. That armrest assembly comprises a support substrate including a receiver and a fabric layer that stretches across the receiver. A matrix interface connects the fabric layer to the support substrate so that the two effectively form an integrated armrest subassembly structure. A cushion overlies the fabric layer in the receiver and a coverstock conceals the cushion and the fabric layer while also closing the receiver.

The matrix interface may comprise a portion of the fabric layer impregnated with a resin of the support substrate. The matrix interface may extend continuously around a peripheral margin of the fabric layer.

The receiver may include a bottom wall at least partially underlying the fabric layer. That bottom wall may include a continuous perimeter shoulder contiguous with the matrix interface. In addition, the bottom wall may further include at least one support section spanning the continuous perimeter shoulder. Thus, in some embodiments the continuous perimeter shoulder and the at least one support section define a plurality of relief openings underlying the fabric layer.

In accordance with an additional aspect, a new and improved method of manufacturing an armrest assembly is provided. That method may be described as including the steps of (a) positioning a fabric layer in a first section of a mold, (b) closing a second section of the mold with the first section of the mold and (c) injecting resin into the mold to form a support substrate.

The method may further include the step of forming a matrix interface connecting the fabric layer to the support substrate. Still further, the method may include impregnating a portion of the fabric layer with the resin injected into the mold.

The method may include the step of cooling the mold to set the resin and bond the fabric layer to the support substrate at the matrix interface. Still further, the method may include the steps of opening the mold and then removing an armrest subassembly from the mold. That armrest subassembly may comprise the support substrate and the fabric layer bonded together by the matrix interface.

Still further, the method may include the step of positioning a cushion overlying the fabric layer within a receiver molded into the armrest substrate. Still further, the method may also include the steps of concealing the cushion and the fabric layer and closing the receiver with a coverstock.

In accordance with yet another aspect, an armrest subassembly is provided. That armrest subassembly includes a support substrate including a receiver, a fabric layer stretching across the receiver and a matrix interface connecting the fabric layer to the support substrate. The matrix interface may comprise a portion of the fabric layer impregnated with resin of the support substrate.

The matrix interface may extend continuously around a peripheral margin of the fabric layer. Further, the receiver may include a bottom wall at least partially underlying the fabric layer. That bottom wall may include a continuous perimeter shoulder contiguous with the matrix interface.

In the following description, there are shown and described several preferred embodiments of the armrest assembly, the armrest subassembly and the method of manufacturing that armrest assembly. As it should be realized, the armrest assembly, the armrest subassembly and the method are capable of other, different embodiments and their several details are capable of modification in various, obvious aspects all without departing from the armrest assembly, the armrest subassembly and the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest assembly, the armrest subassembly and the production method and together with the description serve to explain certain principles thereof.

FIG. 4 is a schematic block diagram of the method of production of the armrest assembly illustrated in FIGS. 2 and 3.

Reference will now be made in detail to the present preferred embodiments of the armrest assembly and the related production method, examples of which are illustrated in the accompanying drawing figures.

DETAILED DESCRIPTION

Figure 2:
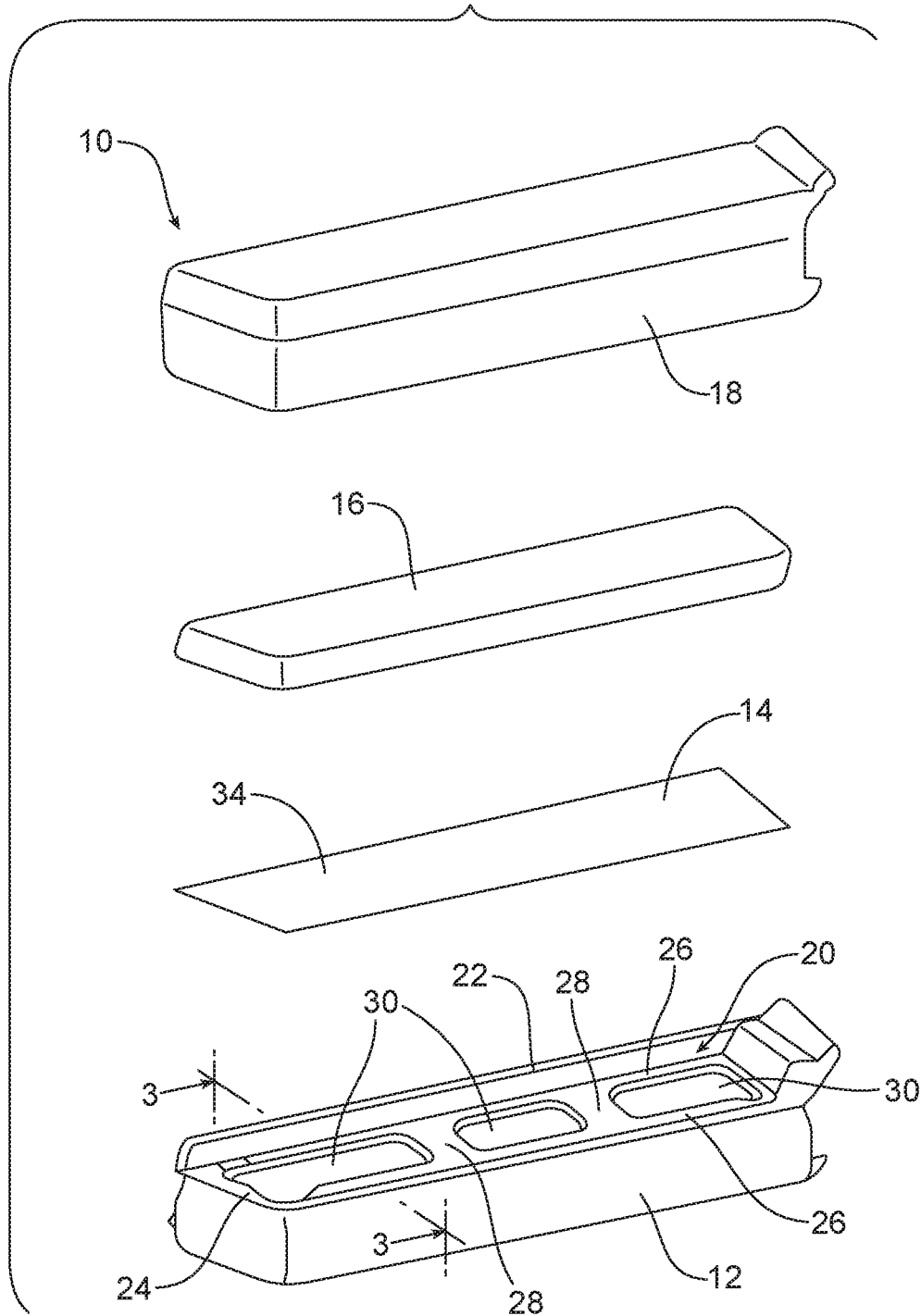
FIG. 2 is an exploded perspective view of the new and improved armrest assembly that is essentially equivalent to the prior armrest assembly illustrated in FIG. 1 but is made from only four components.
Figure 3:
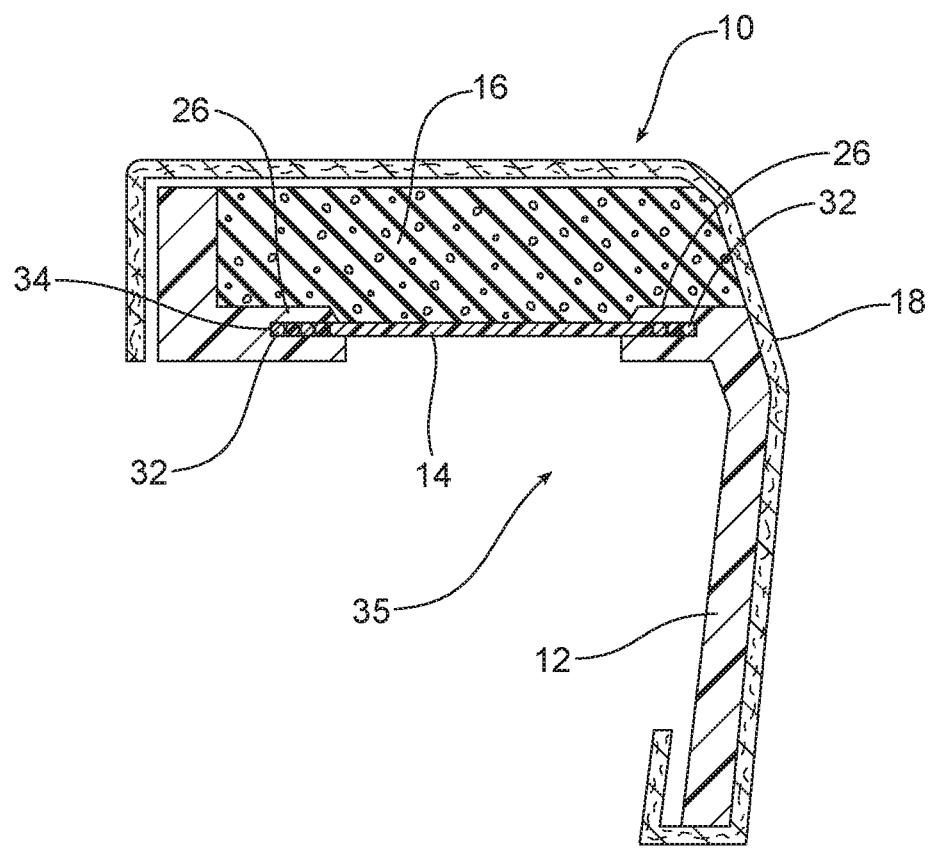
FIG. 3 is a cross sectional view of the assembled armrest assembly illustrated in FIG. 2.

Reference is now made to FIGS. 2 and 3 illustrating the new and improved armrest assembly 10. As illustrated, that armrest assembly 10 includes a support substrate 12, a fabric layer 14, a cushion 16 and an outer coverstock 18. The support substrate 12 may be molded from substantially any appropriate resin material. The support substrate 12 includes a receiver 20 defined within an upstanding outer lip 22.

In the illustrated embodiment, the receiver 20 includes a bottom wall 24 which includes a continuous perimeter shoulder 26 and at least one support section 28 spanning the continuous perimeter shoulder 26. In the illustrated embodiment, the bottom wall 24 includes two support sections 28 spanning the continuous perimeter shoulder and the support sections define a plurality of relief openings 30.

The fabric layer 14 may be made from any appropriate material such as nylon fabric suited for this application and available from various manufacturers. The fabric layer 14 stretches across the receiver 20 so that the bottom wall 24 partially underlies the fabric layer.

A matrix interface 32 connects the fabric layer 14 to the support substrate 12. The matrix interface 32 is where the resin of the armrest substrate 12 impregnates the fabric of the fabric layer 14 and sets to provide a secure bond effectively making the fabric layer and the armrest substrate an integral armrest subassembly 35.

In the illustrated embodiment, the matrix interface 32 extends continuously around a peripheral margin 34 of the fabric layer 14. As also illustrated in FIG. 3, the continuous perimeter shoulder 26 of the bottom wall 24 is contiguous with the matrix interface 32.

The cushion 16 may be made from any appropriate material including various soft foams known to be useful in the art for this particular application. The outer coverstock 18 may be made from any appropriate material known in the art to be useful as an armrest A-surface covering including, for example, various fabrics, cloth, naugahyde, leather and appropriate "soft-touch" materials.

Reference is now made to FIG. 4 illustrating the method 50 of manufacturing the armrest assembly 10. That method includes the step of positioning the fabric layer 14 at a designated point in a first section of a mold for molding the support substrate (see box 52). This is followed by the closing of a second section of the mold with the first section of the mold (see box 54).

Next, the production method includes the step of injecting resin into the mold in order to form the support substrate 12 (see box 56). Further, the method includes forming the matrix interface 32 connecting the fabric layer 14 to the support substrate 12 (see box 58). In the illustrated embodiment, this is done by impregnating the fabric layer 14 with the resin injected into the mold and cooling the mold to set the resin and bond the fabric layer to the support substrate 12 at the matrix interface 32 so as to form the armrest subassembly 35.

Next, the method includes the step of opening the mold (see box 60). This is then followed by the step of removing the armrest subassembly from the mold (see box 62). As previously noted, in the illustrated embodiment the armrest subassembly 35 comprises the support substrate 12 and the fabric layer 14 bonded together at the matrix interface 32.

The manufacturing process then includes the step of positioning the cushion 16 overlying the fabric layer 14 within the receiver 20 molded into the support substrate (see box 64). This is then followed by the steps of concealing the cushion 16 and the fabric layer 14 and closing the receiver 20 with the coverstock 18. The coverstock 18 may be attached to the support substrate 12 by an appropriate adhesive, mechanical fasteners or a combination of adhesive and fasteners. The completed and assembled armrest assembly 10 is illustrated in FIG. 3.

Figure 1:
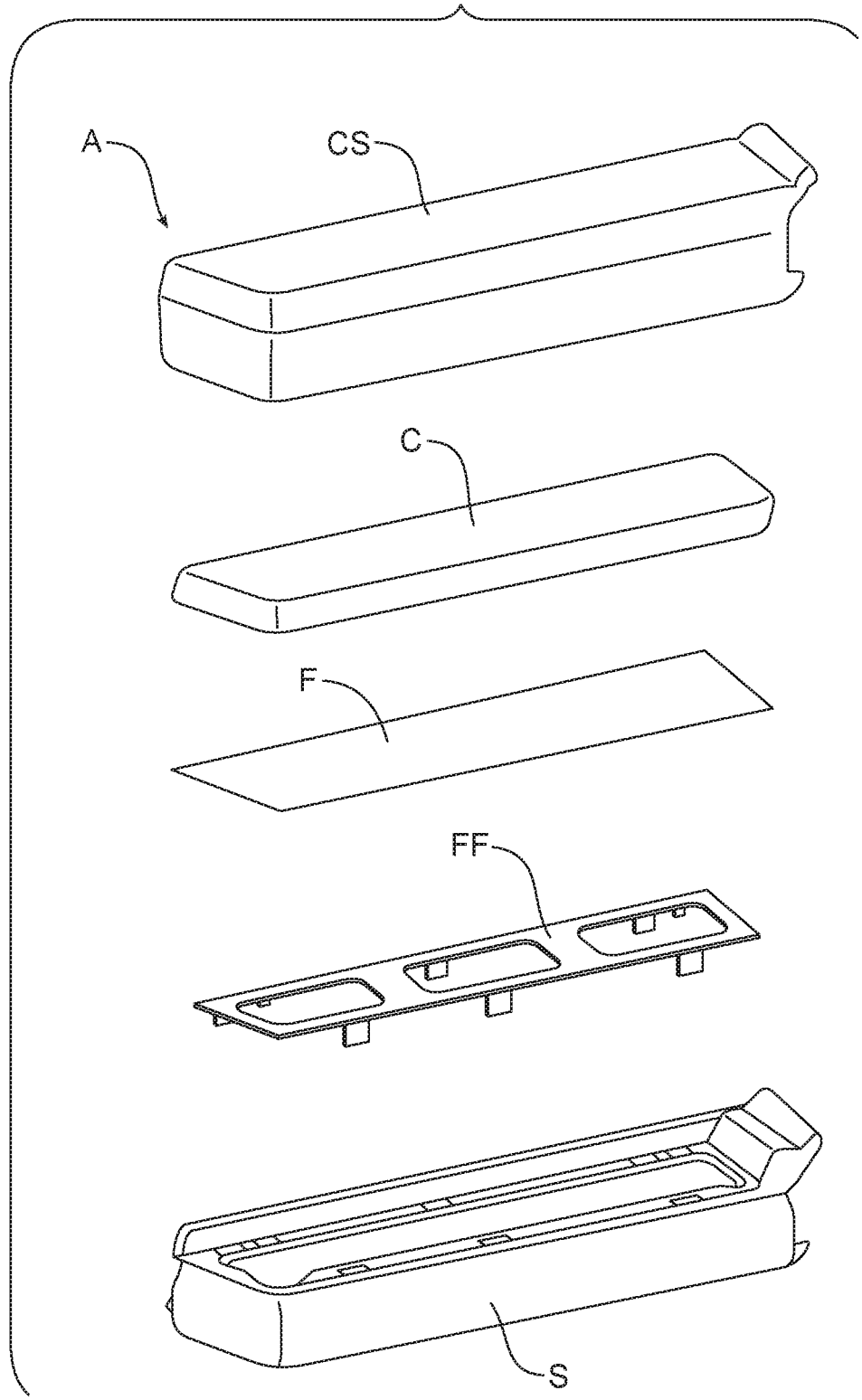
FIG. 1 is an exploded perspective view of a prior art armrest assembly incorporating five separate components.

As should be appreciated from the above description, the new and improved armrest assembly 10 is made from only four components and the production method 50 eliminates the need to separately mold a fabric frame FF and assemble that fabric frame to the support substrate S as required of the prior art armrest assembly A illustrated in FIG. 1. Advantageously, the elimination of a molding step and an assembly step significantly reduces production costs and production time thereby allowing the new and improved armrest assembly 10 to be made in a far more efficient manner.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An armrest subassembly, comprising:
a support substrate including a receiver defined within an upstanding upper lip;
a fabric layer stretching across said receiver; and
a matrix interface connecting said fabric layer to said support substrate, wherein said matrix interface includes a portion of said fabric layer impregnated with resin of said support substrate.

2. The armrest subassembly of claim 1, wherein said matrix interface extends continuously around a peripheral margin of said fabric layer.

3. The armrest subassembly of claim 2 wherein said receiver includes a bottom wall at least partially underlying said fabric layer.

4. The armrest subassembly of claim 3, wherein bottom wall includes a continuous perimeter shoulder contiguous with the matrix interface.

5. An armrest assembly, comprising:
a support substrate including a receiver defined within an upstanding outer lip;
a fabric layer stretching across said receiver;
a matrix interface connecting said fabric layer to said support substrate, said matrix interface includes a portion of said fabric layer impregnated with a resin of said support substrate;
a cushion overlying said fabric layer on said receiver; and
a coverstock concealing said cushion and said fabric layer and closing said receiver.

6. The armrest assembly of claim 1, wherein said matrix interface extends continuously around a peripheral margin of said fabric layer.

7. The armrest assembly of claim 6, wherein said receiver includes a bottom wall at least partially underlying said fabric layer.

8. The armrest assembly of claim 7, wherein said bottom wall includes a continuous perimeter shoulder contiguous with said matrix interface.

9. The armrest assembly of claim 8, wherein said bottom wall further includes at least one support section spanning said continuous perimeter shoulder.

10. The armrest assembly of claim 9, wherein said continuous perimeter shoulder and said at least one support section define a plurality of relief openings underlying said fabric layer.

11. An armrest assembly, comprising:
a support substrate including a receiver;

a fabric layer stretching across said receiver, wherein said receiver includes a bottom wall at least partially underlying said fabric layer;

a matrix interface connecting said fabric layer to said support substrate, wherein said matrix interface includes a portion of said fabric layer impregnated with a resin of said support substrate, wherein said matrix interface extends continuously around a peripheral margin of said fabric layer, and wherein said bottom wall includes a continuous perimeter shoulder contiguous with said matrix interface;

a cushion overlying said fabric layer on said receiver; and a coverstock concealing said cushion and said fabric layer and closing said receiver.

* * * * *